United States Patent
Haut et al.

(10) Patent No.: US 7,472,342 B2
(45) Date of Patent: Dec. 30, 2008

(54) SYSTEM AND METHOD FOR PORTAL PAGE LAYOUT

(75) Inventors: John Haut, Ben Lomond, CA (US);
Philip B. Griffin, Longmont, CO (US);
Jalpesh Patadia, Boulder, CO (US);
Steven Willcox, Boulder, CO (US);
Timothy Breeden, Austin, TX (US)

(73) Assignee: BEA Systems, Inc., San Jose, CA (US)

( * ) Notice: Subject to any disclaimer, the term of this patent is extended or adjusted under 35 U.S.C. 154(b) by 144 days.

(21) Appl. No.: 10/279,663

(22) Filed: Oct. 24, 2002

(65) Prior Publication Data

US 2003/0110448 A1   Jun. 12, 2003

Related U.S. Application Data

(60) Provisional application No. 60/386,487, filed on Oct. 24, 2001.

(51) Int. Cl.
*G06F 17/00* (2006.01)
(52) U.S. Cl. .......................................... 715/234; 715/243
(58) Field of Classification Search ................. 715/513, 715/501.1, 234, 205, 243
See application file for complete search history.

(56) References Cited

U.S. PATENT DOCUMENTS

| | | | |
|---|---|---|---|
| 5,173,939 A | 12/1992 | Abadi et al. | |
| 5,237,614 A | 8/1993 | Weiss | 713/159 |
| 5,335,345 A | 8/1994 | Frieder et al. | |
| 5,347,653 A | 9/1994 | Flynn et al. | 707/203 |
| 5,355,474 A | 10/1994 | Thuraisngham et al. | 707/9 |
| 5,369,702 A | 11/1994 | Shanton | 713/166 |
| 5,426,747 A | 6/1995 | Weinreb et al. | 711/203 |
| 5,481,700 A | 1/1996 | Thuraisingham | |
| 5,544,322 A | 8/1996 | Cheng et al. | 709/229 |
| 5,557,747 A | 9/1996 | Rogers et al. | 709/223 |
| 5,627,886 A | 5/1997 | Bowman | |
| 5,649,195 A | 7/1997 | Scott et al. | |
| 5,757,669 A | 5/1998 | Christie et al. | 709/205 |
| 5,758,355 A | 5/1998 | Buchanan | |
| 5,797,128 A | 8/1998 | Birnbaum | |
| 5,825,883 A | 10/1998 | Archibald et al. | 705/53 |
| 5,826,000 A | 10/1998 | Hamilton | 714/4 |

(Continued)

FOREIGN PATENT DOCUMENTS

EP   1256889 A   11/2002

(Continued)

OTHER PUBLICATIONS

Beck, Micah, et al, "Enalbing Full Service Surrogates Using the POrtable Channel Representation", Proceedings of the Tenth International Conference on World Wide Web, Apr. 2001, pp. 376-385.*

(Continued)

*Primary Examiner*—Laurie Ries
(74) *Attorney, Agent, or Firm*—Fliesler Meyer LLP

(57) ABSTRACT

A system and method for describing a portal page, comprising, defining a placeholder on a template, associating at least one portlet with the placeholder, and wherein the template can be customized for least one of a group and a user.

68 Claims, 3 Drawing Sheets

U.S. PATENT DOCUMENTS

| | | | |
|---|---|---|---|
| 5,826,268 A | 10/1998 | Schaefer et al. | |
| 5,838,909 A | 11/1998 | Roy et al. | |
| 5,848,396 A | 12/1998 | Gerace | 705/10 |
| 5,867,667 A | 2/1999 | Butman et al. | 709/249 |
| 5,872,928 A | 2/1999 | Lewis et al. | |
| 5,889,953 A | 3/1999 | Thebaut et al. | 709/221 |
| 5,918,210 A | 6/1999 | Rosenthal et al. | 705/7 |
| 5,925,126 A | 7/1999 | Hsieh | |
| 5,941,947 A | 8/1999 | Brown et al. | |
| 5,950,195 A | 9/1999 | Stockwell et al. | 707/4 |
| 5,954,798 A | 9/1999 | Shelton et al. | 709/224 |
| 5,956,400 A | 9/1999 | Chaum et al. | 713/167 |
| 5,956,719 A | 9/1999 | Kudo et al. | |
| 5,966,707 A | 10/1999 | Van Huben et al. | 707/10 |
| 5,983,227 A * | 11/1999 | Nazem et al. | 707/10 |
| 5,987,469 A | 11/1999 | Lewis et al. | 707/102 |
| 5,987,611 A | 11/1999 | Freund | 726/4 |
| 5,991,735 A | 11/1999 | Gerace | |
| 5,991,877 A | 11/1999 | Luckenbaugh | |
| 6,005,571 A | 12/1999 | Pachauri | |
| 6,006,194 A | 12/1999 | Merel | 705/8 |
| 6,006,265 A | 12/1999 | Rangan et al. | |
| 6,009,410 A | 12/1999 | Lemole et al. | |
| 6,026,433 A | 2/2000 | D'Arlach et al. | |
| 6,029,144 A | 2/2000 | Barrett et al. | 705/30 |
| 6,029,182 A | 2/2000 | Nehab et al. | 715/523 |
| 6,029,196 A | 2/2000 | Lenz | |
| 6,054,910 A | 4/2000 | Tada et al. | 333/206 |
| 6,055,515 A | 4/2000 | Consentino et al. | 705/27 |
| 6,055,637 A | 4/2000 | Hudson et al. | |
| 6,058,392 A | 5/2000 | Sampson et al. | |
| 6,073,242 A | 6/2000 | Hardy et al. | |
| 6,081,829 A | 6/2000 | Sidana | |
| 6,083,276 A | 7/2000 | Davidson et al. | |
| 6,088,679 A | 7/2000 | Barkley | |
| 6,092,083 A | 7/2000 | Brodersen et al. | |
| 6,098,173 A | 8/2000 | Elgressy et al. | 726/17 |
| 6,105,027 A | 8/2000 | Schneider et al. | |
| 6,108,687 A | 8/2000 | Craig | 709/203 |
| 6,112,192 A | 8/2000 | Capek | |
| 6,122,647 A | 9/2000 | Horowitz et al. | 715/513 |
| 6,128,663 A | 10/2000 | Thomas | |
| 6,133,915 A | 10/2000 | Arcuri et al. | |
| 6,141,010 A | 10/2000 | Hoyle | 715/854 |
| 6,141,686 A | 10/2000 | Jackowski et al. | 709/224 |
| 6,148,311 A * | 11/2000 | Wishnie et al. | 715/513 |
| 6,148,333 A | 11/2000 | Guedalia et al. | 709/219 |
| 6,154,844 A | 11/2000 | Touboul et al. | 726/24 |
| 6,157,924 A | 12/2000 | Austin | 707/10 |
| 6,158,010 A | 12/2000 | Moriconi et al. | |
| 6,161,139 A | 12/2000 | Win et al. | |
| 6,167,407 A | 12/2000 | Nachenberg et al. | 707/203 |
| 6,167,445 A | 12/2000 | Gai et al. | 709/223 |
| 6,167,448 A | 12/2000 | Hemphill et al. | |
| 6,169,794 B1 | 1/2001 | Oshimi et al. | |
| 6,170,009 B1 | 1/2001 | Mandal et al. | 709/223 |
| 6,178,172 B1 | 1/2001 | Rochberger | |
| 6,182,142 B1 | 1/2001 | Win et al. | |
| 6,182,226 B1 | 1/2001 | Reid et al. | 713/201 |
| 6,182,277 B1 | 1/2001 | DeGroot | 717/1 |
| 6,185,587 B1 | 2/2001 | Bernardo et al. | 715/513 |
| 6,188,399 B1 | 2/2001 | Voas et al. | |
| 6,191,786 B1 * | 2/2001 | Eyzaguirre et al. | 715/853 |
| 6,195,696 B1 | 2/2001 | Baber et al. | |
| 6,202,066 B1 | 3/2001 | Barkley et al. | |
| 6,202,157 B1 | 3/2001 | Brownlie et al. | 726/1 |
| 6,202,207 B1 | 3/2001 | Donohue | 717/173 |
| 6,205,466 B1 | 3/2001 | Karp et al. | |
| 6,209,101 B1 | 3/2001 | Mitchem et al. | 726/2 |
| 6,216,231 B1 | 4/2001 | Stubblebine | 726/10 |
| 6,226,745 B1 | 5/2001 | Wiederhold | 713/200 |
| 6,233,576 B1 | 5/2001 | Lewis | |
| 6,236,991 B1 | 5/2001 | Frauenhofer et al. | |
| 6,241,608 B1 | 6/2001 | Torango | 463/27 |
| 6,243,747 B1 | 6/2001 | Lewis et al. | |
| 6,253,321 B1 | 6/2001 | Nikander et al. | 713/160 |
| 6,256,741 B1 | 7/2001 | Stubblebine | |
| 6,260,050 B1 | 7/2001 | Yost et al. | 715/501.1 |
| 6,269,393 B1 | 7/2001 | Yost et al. | 709/201 |
| 6,269,456 B1 | 7/2001 | Hodges et al. | 714/38 |
| 6,275,941 B1 | 8/2001 | Saito et al. | 726/2 |
| 6,285,366 B1 | 9/2001 | Ng et al. | 715/853 |
| 6,285,983 B1 | 9/2001 | Jenkins | |
| 6,285,985 B1 | 9/2001 | Horstmann | 705/14 |
| 6,292,900 B1 | 9/2001 | Ngo et al. | 726/6 |
| 6,295,607 B1 | 9/2001 | Johnson | 726/17 |
| 6,301,613 B1 | 10/2001 | Ahlstrom et al. | 709/223 |
| 6,304,881 B1 | 10/2001 | Halim et al. | |
| 6,308,163 B1 | 10/2001 | Du et al. | 705/8 |
| 6,317,868 B1 | 11/2001 | Grimm et al. | 717/127 |
| 6,321,336 B1 | 11/2001 | Applegate et al. | |
| 6,327,594 B1 | 12/2001 | Van Huben et al. | |
| 6,327,618 B1 | 12/2001 | Ahlstrom et al. | 709/223 |
| 6,327,628 B1 | 12/2001 | Anuff et al. | |
| 6,336,073 B1 | 1/2002 | Ihara et al. | |
| 6,339,423 B1 | 1/2002 | Sampson et al. | 715/854 |
| 6,339,826 B2 | 1/2002 | Hayes et al. | 713/166 |
| 6,341,352 B1 | 1/2002 | Child et al. | 726/1 |
| 6,353,886 B1 | 3/2002 | Howard et al. | 713/156 |
| 6,360,363 B1 | 3/2002 | Moser et al. | |
| 6,377,973 B2 | 4/2002 | Gideon | 709/203 |
| 6,381,579 B1 | 4/2002 | Gervais et al. | 705/8 |
| 6,385,627 B1 | 5/2002 | Cragun | 715/500 |
| 6,393,474 B1 | 5/2002 | Eichert et al. | 709/223 |
| 6,397,222 B1 | 5/2002 | Zellweger | 707/102 |
| 6,397,231 B1 | 5/2002 | Salisbury et al. | 715/515 |
| 6,412,070 B1 | 6/2002 | Van Dyke et al. | 726/17 |
| 6,412,077 B1 | 6/2002 | Roden et al. | 714/4 |
| 6,418,448 B1 | 7/2002 | Sarkar | 707/104.1 |
| 6,430,556 B1 | 8/2002 | Goldberg et al. | 707/4 |
| 6,438,563 B1 | 8/2002 | Kawagoe | |
| 6,449,638 B1 | 9/2002 | Wecker et al. | |
| 6,453,353 B1 * | 9/2002 | Win et al. | 709/229 |
| 6,457,007 B1 | 9/2002 | Kikuchi et al. | 707/10 |
| 6,460,084 B1 | 10/2002 | Van Horne et al. | |
| 6,460,141 B1 | 10/2002 | Olden | |
| 6,463,440 B1 | 10/2002 | Hind et al. | |
| 6,466,239 B2 | 10/2002 | Ishikawa | 715/850 |
| 6,473,791 B1 | 10/2002 | Al-Ghosein et al. | 709/217 |
| 6,477,543 B1 | 11/2002 | Huang et al. | 707/200 |
| 6,477,575 B1 | 11/2002 | Koeppel et al. | 709/224 |
| 6,484,177 B1 | 11/2002 | Van Huben et al. | 707/10 |
| 6,484,261 B1 | 11/2002 | Wiegel | 726/11 |
| 6,487,594 B1 | 11/2002 | Bahlmann | 709/225 |
| 6,510,513 B1 | 1/2003 | Danieli | 713/156 |
| 6,519,647 B1 | 2/2003 | Howard et al. | 709/229 |
| 6,530,024 B1 | 3/2003 | Proctor | 726/23 |
| 6,539,375 B2 | 3/2003 | Kawasaki | 707/5 |
| 6,542,993 B1 | 4/2003 | Erfani | |
| 6,571,247 B1 | 5/2003 | Danno et al. | 707/100 |
| 6,574,736 B1 | 6/2003 | Andrews | |
| 6,581,054 B1 | 6/2003 | Bogrett | |
| 6,581,071 B1 | 6/2003 | Gustman et al. | 707/104.1 |
| 6,584,454 B1 | 6/2003 | Hummel et al. | 705/59 |
| 6,587,849 B1 | 7/2003 | Mason et al. | 707/5 |
| 6,587,876 B1 | 7/2003 | Mahon et al. | 709/223 |
| 6,615,218 B2 | 9/2003 | Mandal et al. | 707/102 |
| 6,618,806 B1 | 9/2003 | Brown et al. | 713/186 |
| 6,633,538 B1 | 10/2003 | Tanaka et al. | 370/222 |
| 6,654,747 B1 | 11/2003 | Van Huben et al. | 707/10 |
| 6,665,677 B1 | 12/2003 | Wotring et al. | 707/100 |
| 6,668,354 B1 | 12/2003 | Chen et al. | |
| 6,684,369 B1 | 1/2004 | Bernardo et al. | 715/513 |
| 6,697,805 B1 | 2/2004 | Choquier et al. | 707/10 |

| Patent No. | Date | Inventors | Class |
|---|---|---|---|
| 6,715,077 B1 | 3/2004 | Vasudevan et al. | |
| 6,721,888 B1 | 4/2004 | Liu et al. | 713/191 |
| 6,732,144 B1 | 5/2004 | Kizu et al. | 709/203 |
| 6,735,586 B2 | 5/2004 | Timmons | |
| 6,735,701 B1 | 5/2004 | Jacobson | 726/1 |
| 6,738,789 B2 | 5/2004 | Multer et al. | |
| 6,751,659 B1 | 6/2004 | Fenger et al. | 709/223 |
| 6,754,672 B1 | 6/2004 | McLauchlin | 707/104.1 |
| 6,757,698 B2 | 6/2004 | McBride et al. | 707/204 |
| 6,757,822 B1 | 6/2004 | Feiertag et al. | |
| 6,769,095 B1 | 7/2004 | Brassard et al. | 715/513 |
| 6,769,118 B2 | 7/2004 | Garrison et al. | 717/177 |
| 6,772,332 B1 | 8/2004 | Boebert et al. | |
| 6,779,002 B1 | 8/2004 | Mwaura | |
| 6,789,202 B1 | 9/2004 | Ko et al. | 726/23 |
| 6,792,537 B1 | 9/2004 | Liu et al. | |
| 6,832,313 B1 | 12/2004 | Parker | |
| 6,834,284 B2 | 12/2004 | Acker et al. | 707/103 R |
| 6,854,035 B2 | 2/2005 | Dunham et al. | |
| 6,856,999 B2 | 2/2005 | Flanagin et al. | 707/103 Y |
| 6,857,012 B2 | 2/2005 | Sim et al. | |
| 6,865,549 B1 | 3/2005 | Connor | 705/51 |
| 6,873,988 B2 | 3/2005 | Herrmann et al. | |
| 6,880,005 B1 | 4/2005 | Bell et al. | 709/225 |
| 6,889,222 B1 | 5/2005 | Zhao | 707/3 |
| 6,901,403 B1 | 5/2005 | Bata et al. | 707/101 |
| 6,904,454 B2 | 6/2005 | Stickler | 709/213 |
| 6,920,457 B2 | 7/2005 | Pressmar | 707/101 |
| 6,922,695 B2 | 7/2005 | Skufca et al. | |
| 6,931,549 B1 | 8/2005 | Ananda | |
| 6,934,934 B1 | 8/2005 | Osborne et al. | |
| 6,957,261 B2 | 10/2005 | Lortz | 709/226 |
| 6,961,897 B1 | 11/2005 | Peel et al. | 715/501.1 |
| 6,965,999 B2 | 11/2005 | Fox et al. | 726/22 |
| 6,970,445 B2 | 11/2005 | O'Neill et al. | |
| 6,970,876 B2 | 11/2005 | Hotti et al. | 707/101 |
| 6,978,379 B1 | 12/2005 | Goh et al. | 726/10 |
| 6,985,915 B2 | 1/2006 | Somalwar et al. | 707/203 |
| 6,988,138 B1 | 1/2006 | Alcorn et al. | 709/225 |
| 7,003,578 B2 | 2/2006 | Kanada et al. | 709/230 |
| 7,035,944 B2 | 4/2006 | Fletcher et al. | 709/250 |
| 7,047,522 B1 | 5/2006 | Dixon et al. | |
| 7,054,910 B1 | 5/2006 | Nordin et al. | 709/208 |
| 7,062,490 B2 | 6/2006 | Adya et al. | 707/10 |
| 7,062,511 B1 | 6/2006 | Poulsen | 707/104.1 |
| 7,080,000 B1 | 7/2006 | Cambridge | 703/21 |
| 7,089,584 B1 | 8/2006 | Sharma | 726/4 |
| 7,093,200 B2 | 8/2006 | Schreiber et al. | 715/835 |
| 7,093,261 B1 | 8/2006 | Harper et al. | |
| 7,093,283 B1 | 8/2006 | Chen et al. | |
| 7,124,413 B1 | 10/2006 | Klemm et al. | |
| 7,174,563 B1 | 2/2007 | Brownlie et al. | 726/1 |
| 7,185,192 B1 | 2/2007 | Kahn | |
| 7,219,140 B2 | 5/2007 | Marl et al. | |
| 7,272,625 B1 | 9/2007 | Hannel et al. | |
| 2001/0009016 A1 | 7/2001 | Hofmann et al. | |
| 2001/0032128 A1 | 10/2001 | Kepecs | |
| 2001/0032209 A1* | 10/2001 | Duxbury | 707/103 X |
| 2001/0034771 A1* | 10/2001 | Hutsch et al. | 709/217 |
| 2001/0039586 A1 | 11/2001 | Primak et al. | |
| 2001/0044810 A1 | 11/2001 | Timmons | |
| 2001/0047485 A1 | 11/2001 | Brown et al. | |
| 2002/0005867 A1 | 1/2002 | Gvily | |
| 2002/0019827 A1 | 2/2002 | Shiman et al. | |
| 2002/0029296 A1 | 3/2002 | Anuff et al. | |
| 2002/0049815 A1* | 4/2002 | Dattatri | 709/206 |
| 2002/0059394 A1 | 5/2002 | Sanders | |
| 2002/0062451 A1 | 5/2002 | Scheidt et al. | |
| 2002/0067370 A1 | 6/2002 | Forney et al. | |
| 2002/0069261 A1 | 6/2002 | Bellare et al. | 709/218 |
| 2002/0087571 A1 | 7/2002 | Stapel et al. | |
| 2002/0095332 A1* | 7/2002 | Doherty et al. | 705/14 |
| 2002/0103818 A1 | 8/2002 | Amberden | |
| 2002/0104071 A1 | 8/2002 | Charisius et al. | |
| 2002/0107913 A1 | 8/2002 | Rivera et al. | 709/203 |
| 2002/0107920 A1 | 8/2002 | Hotti | |
| 2002/0111998 A1 | 8/2002 | Kim | |
| 2002/0112171 A1 | 8/2002 | Ginter et al. | |
| 2002/0120685 A1 | 8/2002 | Srivastava et al. | |
| 2002/0124053 A1 | 9/2002 | Adams et al. | |
| 2002/0135617 A1 | 9/2002 | Samid | |
| 2002/0143819 A1 | 10/2002 | Han et al. | |
| 2002/0147645 A1 | 10/2002 | Alao et al. | |
| 2002/0147696 A1 | 10/2002 | Acker et al. | |
| 2002/0152267 A1 | 10/2002 | Lennon | |
| 2002/0152279 A1 | 10/2002 | Sollenberger et al. | |
| 2002/0161903 A1 | 10/2002 | Besaw | |
| 2002/0169893 A1 | 11/2002 | Chen et al. | |
| 2002/0169975 A1 | 11/2002 | Good | |
| 2002/0173971 A1 | 11/2002 | Stirpe et al. | 705/1 |
| 2002/0178119 A1 | 11/2002 | Griffin et al. | |
| 2002/0188869 A1 | 12/2002 | Patrick | |
| 2002/0194267 A1 | 12/2002 | Flesner et al. | |
| 2003/0014442 A1 | 1/2003 | Shiigi et al. | |
| 2003/0032409 A1 | 2/2003 | Hutcheson et al. | |
| 2003/0046576 A1 | 3/2003 | High et al. | |
| 2003/0065721 A1 | 4/2003 | Roskind | |
| 2003/0069874 A1 | 4/2003 | Hertzog et al. | |
| 2003/0078959 A1 | 4/2003 | Yeung et al. | |
| 2003/0078972 A1 | 4/2003 | Tapissier et al. | |
| 2003/0088617 A1 | 5/2003 | Clark et al. | |
| 2003/0110448 A1 | 6/2003 | Haut et al. | |
| 2003/0115484 A1 | 6/2003 | Moriconi et al. | |
| 2003/0120686 A1 | 6/2003 | Kim et al. | |
| 2003/0126464 A1 | 7/2003 | McDaniel et al. | |
| 2003/0126558 A1 | 7/2003 | Griffin | |
| 2003/0131113 A1 | 7/2003 | Reeves et al. | 709/229 |
| 2003/0135490 A1 | 7/2003 | Barrett et al. | |
| 2003/0140308 A1 | 7/2003 | Murthy et al. | |
| 2003/0146937 A1 | 8/2003 | Lee | |
| 2003/0167315 A1 | 9/2003 | Chowdhry et al. | |
| 2003/0167455 A1 | 9/2003 | Iborra et al. | |
| 2003/0182577 A1 | 9/2003 | Mocek | |
| 2003/0187956 A1 | 10/2003 | Belt et al. | |
| 2003/0200350 A1 | 10/2003 | Kumar et al. | |
| 2003/0204481 A1 | 10/2003 | Lau | |
| 2003/0212766 A1 | 11/2003 | Giles et al. | |
| 2003/0216938 A1 | 11/2003 | Shour | |
| 2003/0220913 A1 | 11/2003 | Doganata et al. | |
| 2003/0220963 A1 | 11/2003 | Golovinsky et al. | |
| 2003/0229501 A1 | 12/2003 | Copeland et al. | |
| 2003/0229623 A1 | 12/2003 | Chang et al. | |
| 2004/0003071 A1 | 1/2004 | Mathew et al. | |
| 2004/0010719 A1 | 1/2004 | Daenen | |
| 2004/0019650 A1 | 1/2004 | Auvenshine | |
| 2004/0024812 A1 | 2/2004 | Park et al. | |
| 2004/0030744 A1 | 2/2004 | Rubin et al. | |
| 2004/0030795 A1 | 2/2004 | Ilesmer et al. | |
| 2004/0078371 A1 | 4/2004 | Worrall et al. | |
| 2004/0098467 A1 | 5/2004 | Dewey et al. | |
| 2004/0098606 A1 | 5/2004 | Tan et al. | |
| 2004/0107360 A1 | 6/2004 | Hermann et al. | |
| 2004/0162905 A1 | 8/2004 | Griffin et al. | |
| 2004/0167880 A1 | 8/2004 | Smith et al. | |
| 2004/0167899 A1 | 8/2004 | Patadia et al. | |
| 2004/0205473 A1 | 10/2004 | Fisher et al. | |
| 2004/0205557 A1 | 10/2004 | Bahrs et al. | |
| 2004/0215650 A1 | 10/2004 | Shaji et al. | |
| 2004/0230546 A1 | 11/2004 | Rogers | |
| 2004/0236760 A1 | 11/2004 | Arkeketa et al. | |
| 2004/0243824 A1 | 12/2004 | Jones | |
| 2005/0021502 A1 | 1/2005 | Chen et al. | |
| 2005/0021656 A1 | 1/2005 | Callegari | |
| 2005/0050184 A1 | 3/2005 | Boden et al. | |
| 2005/0060324 A1 | 3/2005 | Johnson et al. | |
| 2005/0086206 A1 | 4/2005 | Balasubramanian et al. | |

| | | | |
|---|---|---|---|
| 2005/0097008 A1 | 5/2005 | Ehring et al. | |
| 2005/0256894 A1 | 11/2005 | Talanis et al. | |
| 2005/0257267 A1 | 11/2005 | Williams et al. | |
| 2006/0059107 A1 | 3/2006 | Elmore et al. | |
| 2006/0085412 A1 | 4/2006 | Johnson et al. | |
| 2006/0122882 A1 | 6/2006 | Brown et al. | |
| 2006/0167858 A1 | 7/2006 | Dennis et al. | |

FOREIGN PATENT DOCUMENTS

| | | |
|---|---|---|
| WO | WO 0038978 | 6/2000 |
| WO | WO 0114962 | 3/2001 |
| WO | WO 0167285 A | 9/2001 |
| WO | WO 01/77823 A1 | 10/2001 |
| WO | WO 02/063496 A2 | 8/2002 |

OTHER PUBLICATIONS

Microsoft Computer Dictionary, Third Edition, Microsoft Press, 1997, pp. 220.*
Microsoft Computer Dictionary, Fourth Edition, Microsoft Press, 1999, pp. 1-2, 404.*
Schaeck, Thomas, "WebSphere Portal Server and Web Services Whitepaper", IBM Software Group, downloaded from http://www-4.ibm.com/software/solutions/webservices/pdf/WPS.pdf, May 2001, pp. A, 1-23.*
Eiji Okamoto, "Proposal for Integrated Security Systems", Jun. 1992, IEEE Computer Society Press, p. 354-358.
http://java.sun.com/products/ejb/ (last visit: Dec. 7, 2004).
http://www.javaworld.com/jw-12-2002/jw-1207-yesnoejb_p.html (last visit: Dec. 7, 2004).
Sundsted, Todd, "JNDI Overview, Part 1: An Introduction to Naming Services", JavaWorld, Jan. 2000. pp. 1-6, (downloaded from: www.javaworld.com/javaworld/jw-01-2000/jw-01-howto_p.html.).
Moore, Bill, et al., "Migrating Weblogic Applications to WebSphere Advances Edition", IBM Redbooks, Jan. 2001, pp. 1, 3-4, 109-111 and 181-195.
Barrett, Alexandra, "Trying Out Transactions", SunExpert Magazine, Jan. 1999, pp. 57-59.
Ayers, Danny, et al., Professional Java Server Programming, Wrox Press, Ltd., Birmingham, UK, Dec. 1999, pp. 515-545.
Ford, Nigel, Web Developer.com Guide to Building Intelligent Web Sites with JavaScript, Wiley Computer Publishing, NY, NY © 1998, pp. 65-86, 96-98, 101-102, 245-250 and 324-327.
Microsoft Computer Dictionary, 4th Edition, Microsoft Press, Redmond, WA, © 1999, p. 489.
"Guide to Using the BEA E-Business Control Center," *BEA WebLogic Portal*, Version 4.0 (Oct. 2001) 356 pages.
U.S. Appl. No. 10/279,449, filed Oct. 24, 2002, Philip B. Griffin.
U.S. Appl. No. 10/279,450, filed Oct. 24, 2002, Daniel Selman et al.
U.S. Appl. No. 10/279,542, filed Oct. 24, 2002, Thomas A. Cook et al.
U.S. Appl. No. 10/279,543, filed Oct. 24, 2002, Philip B. Griffin et al.
U.S. Appl. No. 10/279,564, filed Oct. 24, 2002, Philip B. Griffin et al.
U.S. Appl. No. 10/279,696, filed Oct. 24, 2002, Shelly Qian et al.
U.S. Appl. No. 10/279,951, filed Oct. 24, 2002, Chris Jolley et al.
Moran, D.B., et al. "Multimodal User Interfaces in the Open Agent Architecture," *ACM 0-89791-839-8/96/01, IUI 97*, Orlando Florida USA (1997) pp. 61-68.
Rouff, C., "Formal Specification of User Interfaces," *SIGCHI Bulletin* vol. 28, No. 3 (Jul. 1996) pp. 27-33.
International Search Report, PCT/US02/34048, Dec. 23, 2002, 2 sheets.
International Search Report, PCT/US02/34008, Dec. 31, 2002, 5 sheets.
International Search Report, PCT/US02/34006, Jan. 13, 2003, 3 sheets.
International Search Report, PCT/US02/34007, Jan. 21, 2003, 3 sheets.
International Search Report, PCT/US02/34089, Feb. 10, 2003, 4 sheets.
International Search Report, PCT/US02/34309, Feb. 14, 2003, 4 sheets.
International Search Report, PCT/US02/34308, Mar. 5, 2003, 4 sheets.
International Search Report, PCT/US02/34088, Mar. 7, 2003, 3 sheets.
Enabling Full Service Surrogates Using the Portable Channel Representation, Micah Beck, Terry Moore, University of Tennessee, WWW10, May 1-5, 2001, Hong Kong. ACM 1-58113-348-0/01/0005.
International Search Report, PCT/US04/04078, Dec. 15, 2005, 3 sheets.
International Search Report, PCT/US04/04140, Dec. 27, 2005, 3 sheets.
US DataCenters . . . eBusiness, Business Wire, p. 2079, Apr. 4, 2001.
Hunter, Jason, "Java Servlet Programming"; second edition, O'Reilly, Apr. 11, 2001.
Symborski C.W., "Updating software and configuration data in a distributed communications network", Computer Networking Symposium, 1988, Proceedings of the Washington, DC USA Apr. 11-13, 1988, Washington, DC, IEEE Comput. Soc. Pr., US, Apr. 11, 1988, pp. 331-338, XP010011864, ISBN: 0-8186-0835-8.
Supplementary European Search Report for Application No. EP 02 77 3915.0-2201 dated Oct. 12, 2006, 3 pages.
Adomavicius, Gediminas, et al. "User Profiling in Personalization Applications Through Rule Discovery and Validation", KDD '99, San Diego, CA, © ACM 1999, pp. 377-381.
Cingil, Ibrahim, et al., "A Broader Approach to Personalization", Communications of the ACM, vol. 43, No. 6, Aug. 2000, pp. 136-141.
Stephanidis, Constantine, et al., Decision Making in Intelligent User Interface, IUI '97, Orlando, FL, © 1997 ACM, pp. 195-202.
Stiemerling, Oliver, et al. "How to Make Software Softer—Designing Tailorable Applications", DIS '97, Amsterdam, The Netherlands, © 1997 ACM, pp. 365-376.
Zhang, et al., "Designing a Robust Namespace for Distributed File Services", Proceedings of the $20^{th}$ IEEE Symposium on Reliable Distributed Systems, Oct. 28-31, 2001, pp. 162-171.
Adya, Atul, et al., "Farsite: Federated, Available, and Reliable Storage for an Incompletely Trusted Environment", ACM SIGOPS Operating Systems Review, vol. 36, Issue S1, OSDI '02: Proceedings of the $5^{th}$ Symposium on Operating Systems and Design Implementation, (Winter 2002), pp. 1-14.
Candan, K.S., et al., "Enabling Dynamic Content Caching for Database-Driven Web Sites", Proceedings of the 2001 ACM SIGMOD International Conference on Management of Data, Santa Barbara, California, May 21-24, 2001, pp. 532-543.
Catley, Christina, et al., "Design of a Health Care Architecture for Medical Data Interoperability and Application Integration", Proceedings of the Second Joint EMBS/BMES Conference, Houston, Texas, Oct. 23-26, 2002; IEEE, vol. 3, pp. 1952-1953.
Browne, Shirley, et al., "Location-Independent Naming for Virtual Distributed Software Repositories", ACM Symposium on Software Reusability, Seattle, WA, US, Aug. 1995, vol. 20, Issue SI, pp. 179-185; http://portal.acm.org/dl.cfm.
Supplementary European Search Report for Application No. EP 01975484.5, EPO, dated Dec. 19, 2006, 3 pages.
Kistler, T. et al., "WebL—A Programming Language for the Web", Computer Networks and ISDN Systems, vol. 30, No. 1-7, North Holland Publishing, Amsterdam, NL, Apr. 1998, pp. 259-270.
Levy, M.R., "Web Programming in Guide", Software Practice & Experience, vol. 28, No. 15, Wiley & Sons, Ltd., Bognor Regis, GB, Dec. 25, 1998, pp. 1581-1603.
Atkins, D.L., et al.,."MAWL: A Domain-Specific Language for Form-Based Services", IEEE Transactions on Software Engineering, vol. 25, No. 3, IEEE Service Center, Los Alamitos, CA, May-Jun. 1999, pp. 334-346.
L. Koved, et al.,"Security Challenges for Enterprise Java in an E-Business Environment", IBM Systems Journal, Jan. 2001; retrieved from:< http://portal.acm.org/citation.cfm?id=1011436>, 1 page, last visited: Oct. 24, 2007.
L. Koved, et al., "Security Challenges for Enterprise Java in an E-Business Environment", IBM Systems Journal, Jan. 2001, pp. 130-152, vol. 40, Issue 1.
Microsoft, "Microsoft Windows XP Professional", Version 5.1, copyright 1981-2001 Microsoft Corporation, 3 pages (Figures 1-3).

Hayton, R.J. et al., "Access Control in an Open Distributed Environment," 1998 Proceedings of the IEEE Symposium on Security on Security & Privacy, May 3-6, 1998, Oakland, California, USA, 12 pages.

Bertino, Elisa et al., "TRBAC: A Temporal Role-Based Access Control Model," ACM Transactions on Information and System Security (TISSEC), vol. 4, Issue 3 (Aug. 2001), pp. 191-223.

Sandhu, Ravi S. et al., "Role-Based Access Control Models," IEEE Computer, vol. 29, No. 2, Feb. 1996, pp. 38-47.

Covington, Michael J. et al., "Securing Context-Aware Applications Using Environment Roles," ACM Workshop on Role Based Access Control, Proceedings of the Sixth ACM Symposium on Access Control Models and Technologies, SACMAT '01, May 3-4, 2001, Chantilly, Virginia, USA, pp. 10-20.

Yao, Walt et al., "A Model of Oasis Role-Based Access Control and Its Support for Active Security," ACM Workshop on Role Based Access Control, Proceedings of the Sixth ACM Symposium on Access Control Models and Technologies, SACMAT '01, May 3-4, 2001, Chantilly, Virginia, USA, pp. 171-181.

Georgiadis, Christos K. et al., "Flexible Team-Based Access Control Using Contexts," ACM Workshop on Role Based Access Control, Proceedings of the Sixth ACM Symposium on Access Control Models and Technologies, SACMAT '01, May 3-4, 2001, Chantilly, Virginia, USA, pp. 21-27.

Tzelepi, Sofia K. et al., "A Flexible Content and Context-Based Access Control Model for Multimedia Medical Image Database Systems," International Multimedia Conference, Proceedings of the 2001 ACM Workshop on Multimedia and Security: New Challenges, Oct. 5, 2001, pp. 52-55.

Goh, Chen et al., "Towards a More Complete Model of Role," Symposium on Access Control Models and Technologies, Proceedings of the Third ACM Workshop on Role-Based Access Control, 1998, Fairfax, Virginia, USA, pp. 55-61.

"USDataCenters Chooses Baltimore SelectAccess to Enable Next Generation Security Solutions for eBusiness", Business Wire, p. 2079, Apr. 4, 2001, pp. 1-2.

Parker, E., "The Complete Idiot's Guide to Microsoft® FrontPage® 2000", © 1999, Que, pp. 7 and 52.

Tanyi, E., "Easy XML, 1.0", WinSite, Mar. 6, 2000, 6 pages; http://www.winsite.com/bin/Info?500000000897.

"Method and System for Visually Constructing Document Type Definitions and Related Artifacts Using a Reusable Object Model", IBM Technical Disclosure Bulletin, IP.com No. IPCOM000014584D, © IP.com, Inc., May 23, 2001, 3 pages.

"USDatacenters Chooses Baltimore SelectAccess to Enable Next Generation Security Solutions for ebusiness", Business Wire, Apr. 4, 2001, 2 pages.

Rossi, G., et al., "Designing Personalized Web Applications", WWWIO, Hong Kong, May 1-5, 2001, pp. 275-284.

Lee, A., et al., "Keeping Virtual Information Resources Up and Running", IBM Press, Nov. 1997, pp. 1-14.

* cited by examiner

SYSTEM AND METHOD FOR PORTAL PAGE LAYOUT

CLAIM OF PRIORITY

This application claims priority from ENHANCED PORTALS [FLAGSTAFF RELEASE], U.S. Provisional Application No. 60/386,487, Inventors: Phil Griffin, et al., filed on Oct. 24, 2001, and which is incorporated herein by reference.

CROSS REFERENCES

This application is related to the following applications which are each hereby incorporated by reference in their entirety: SYSTEM AND METHOD FOR PORTAL RENDERING, U.S. application Ser. No. 10/279,696, Inventors: Shelly Qian, et al., filed on Oct. 24, 2002. (BEAS-1160US0); SYSTEM AND METHOD FOR DELEGATED ADMINISTRATION, U.S. application Ser. No. 10/279,543, Inventors: Philip B. Griffin, et al., filed on Oct. 24, 2002. (BEAS-1157US0); SYSTEM AND METHOD FOR RULE-BASED ENTITLEMENTS, U.S. application Ser. No. 10/279,564, Inventors: Philip B. Griffin, et al., filed on Oct. 24, 2002. (BEAS-1158US0); SYSTEM AND METHOD FOR APPLICATION FLOW INTEGRATION IN A PORTAL FRAMEWORK, U.S. application Ser. No. 10/279,951, Inventors: Chris Jolley, et al., filed on Oct. 24, 2002. (BEAS-1159US0); SYSTEM AND METHOD FOR XML DATA REPRESENTATION OF PORTLETS, U.S. application Ser. No. 10/279,449, Inventor: Philip B. Griffin, filed on Oct. 24, 2002. (BEAS-01161US0); DATA SYNCHRONIZATION, U.S. application Ser. No. 10/279,450, Inventors: Daniel Selman, et al., filed on Oct. 24, 2002. (BEAS-1163US0); PORTAL ADMINISTRATION TOOL, U.S. application Ser. No. 10/279,542, Inventors: Thomas A. Cook, et al., filed on Oct. 24, 2002. (BEAS-1275US0);.

FIELD OF THE DISCLOSURE

The present invention disclosure relates to website portal design, and in particular, portal page layouts.

BACKGROUND

A portal is a point of access to data and applications that provides a unified and potentially personalized view of information and resources. Typically, a portal is implemented as one or more pages on a website. Portal pages can integrate many elements, such as live data feeds, static information and multimedia presentations. For example, a portal page could combine news headlines and a stock quote ticker that change over time with inert information such as maps, images and text. When a portal page is designed, software that drives these various elements must be programmed such that the desired page is rendered. This presents a obstacle to average users who wish to design and customize such pages unencumbered by implementation details. What is needed is a flexible, accessible way to create and maintain portal pages.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
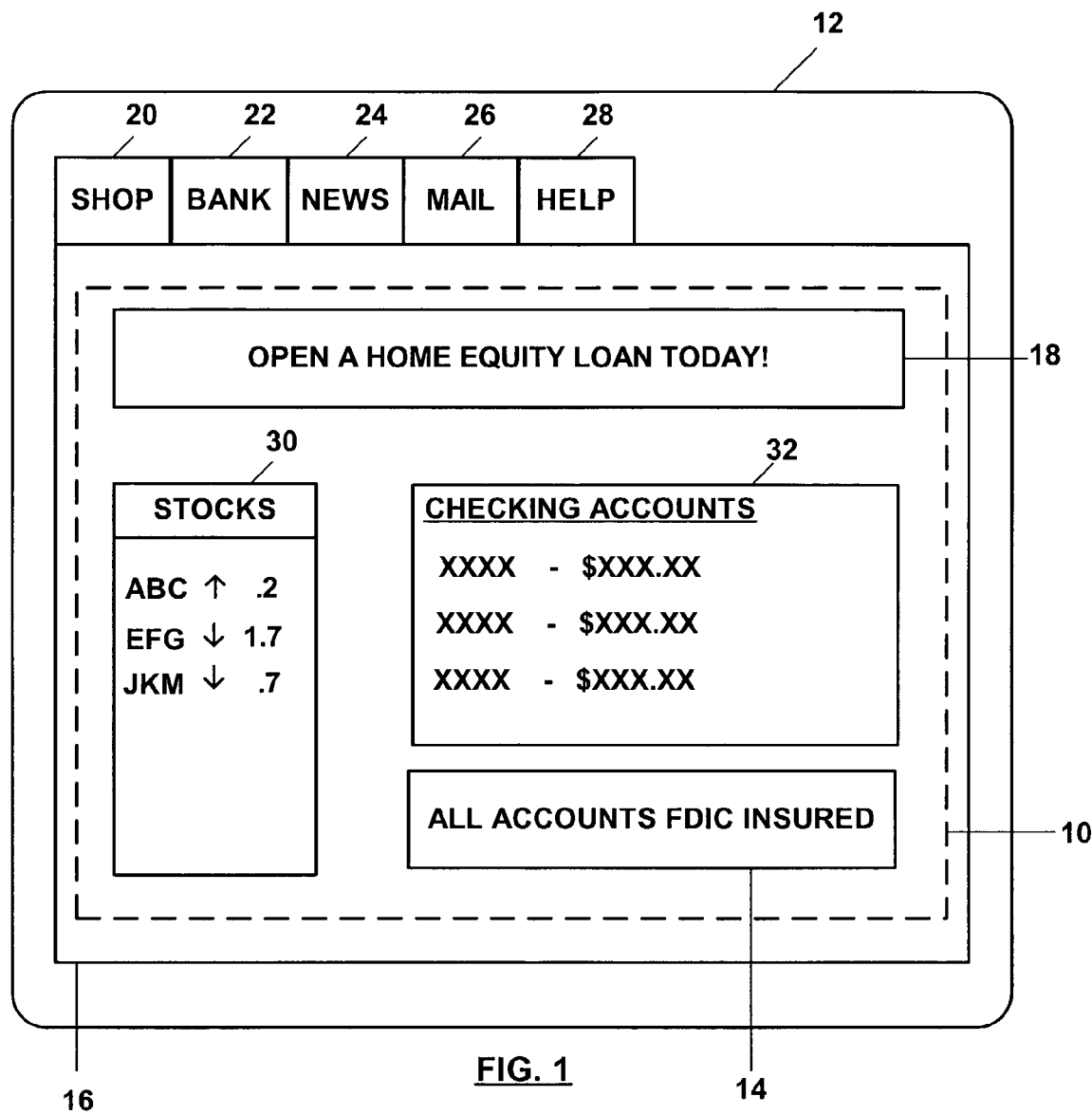
FIG. 1 is an illustration of an exemplary portal page in accordance to one embodiment of the invention.

FIG. 1 is an illustration of an exemplary portal page in accordance to one embodiment of the invention. In one embodiment, by way of example, portal page 16 is rendered upon display area 12, which can be a region in the display area of a device for displaying images and/or producing sounds (e.g., a computer monitor). Portal page 16 is comprised of several elements. Portal page selection tabs 20-28 can each be selected by a user to render a different page within the portal. Portal pages can be thought of as panels or panes that can be swapped into and out of a display region of the available portal real estate. By way of a non limiting example, selection of a portal element can be accomplished with an input device such as a mouse, a motion detector, voice commands, hand or eye gestures, etc. If tab 20 were selected, for example, the portal page corresponding to that tab would be rendered. Although the tabs 20-28 in FIG. 1 are displayed horizontally, in another embodiment the tabs could be displayed vertically or using some other scheme. In yet another embodiment, the tabs 20-28 could be rendered as buttons or as other kinds of interactive controls.

Within portal page 16 is display area 10, which includes portlets and other elements. A portlet is an application that manages its own graphical user interface (GUI). Portlets can communicate with each other and with other software and hardware components (e.g., Enterprise Java Beans™, Java™ Beans, servlets, applets, etc.). The Java™ programming language, its libraries, environment, and toolkits are available from Sun Microsystems, Inc. of Santa Clara, Calif. The other software and hardware components may be part of the same execution environment as the portlet or may be in a different execution environment. In one embodiment, a portlet is implemented as a JavaServer Page™. Portlet GUI 30 displays real-time stock ticker information. A user could configure such a portlet to display certain stocks, for example. In another embodiment, the user can select a given stock displayed in portlet GUI 30 and receive more detailed information, such as the price history, price to earnings ratio, etc. Portlet 30 would be responsible for handling user input and responding accordingly. Portlet GUI 32 displays up-to-date information pertaining to a user's checking accounts. Likewise, portlet GUI 32 could provide detailed information on transactions if the user were to select an account. Advertisement portlet GUI 18 displays an advertisement that could be directed specifically to the current user based on demographics or other information. For instance, if a user had an outstanding home loan in good standing, the advertisement could be for a home equity loan. Likewise, if the user had an appropriate amount in a savings account, the advertisement could be for a new car loan. Static area 14 contains text or an image with text.

In one embodiment, a display area such as 10 can be described with a template. Templates can specify the location of elements on a portal page. A template can include one or more placeholders which define regions of the template wherein a portlet can display itself, or wherein other static or dynamic content can be rendered. A given placeholder can host more than one portlet. In such a case, the template area occupied by the placeholder could be shared amongst the portlets in a number of ways, including but not limited to stacking portlets on top of one another (not shown). In another embodiment, a template can be implemented as a Hypertext Markup Language (HTML) table and created with conventional HTML editors. Each cell in a such a table can represent a placeholder. Placeholders can be assigned identifiers during design of the template that are dynamically bound to portlet GUI's during portal page rendering.

Figure 2:
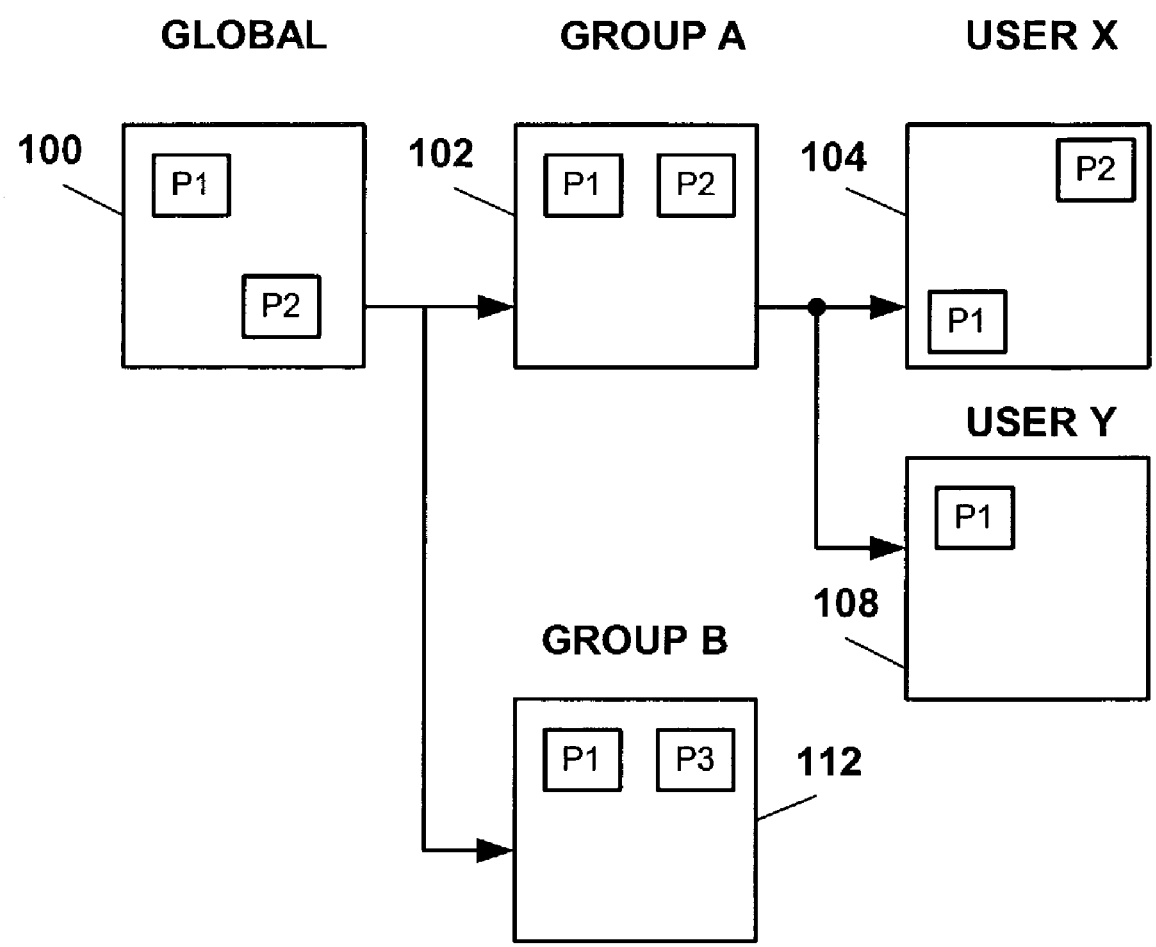
FIG. 2 is diagram of portal page customization in accordance to one embodiment of the invention.

FIG. 2 is diagram of portal page customization in accordance to one embodiment of the invention. In one embodiment, customization of a portal page involves the placement of portal elements on a template. In one embodiment, a template is afforded an arbitrary number of levels of customization. In another embodiment, a template can have three levels of customization: global, group and user. An initial template created for a portal page is customized at the global level. This is the default template used for describing the portal page if there are no further customizations. Further customizations at the group level supersede customizations at the global level. Likewise, customizations at the user level take precedence over group and global level customizations.

In FIG. 2, global template 100 is customized to include two portlet GUI's, P1 and P2. In one embodiment, a portal can be associated with more than one user group. Each group can define its own look and feel for a particular portal page. In one embodiment, a user group can be an arbitrary collection of users that is determined statically or dynamically by evaluating rules that take into account information about a user and other information. A global template can be customized to meet the needs of each particular group. For example, Group A template 102 modifies global template 100 such that portlet GUI P2 is repositioned to the upper right-hand corner of the Group A template 102. Group B template 112 customizes global template 100 by deleting portal GUI P2 and adding portal GUI P3. A group template is used for rendering the portal page for all members of the group, unless a group member has further customized it. For example, Group A member User X has repositioned portlet GUI P1 to the lower left-hand corner of user template 104. User Y has customized Group A template 102 with user template 108. User template 108 removes portlet P2, but leaves portlet P1 in the same position as it was in group template 102.

In another embodiment, template customization can be controlled by delegated system administration which both limits and delegates administrative responsibilities for groups and users. For example, customization of a template may involve removing or adding portlets. It may acceptable to endow a group administrator with this flexibility, but not an ordinary user. For this reason, a group administrator may set portlet attributes which prevent a user from adding, removing or moving a given portlet during user customization of a group template. But it also may be desirous to allow a small subset of users to have these capabilities. In this case, a group administrator could delegate some or all of their capabilities to one or more users.

Figure 3:
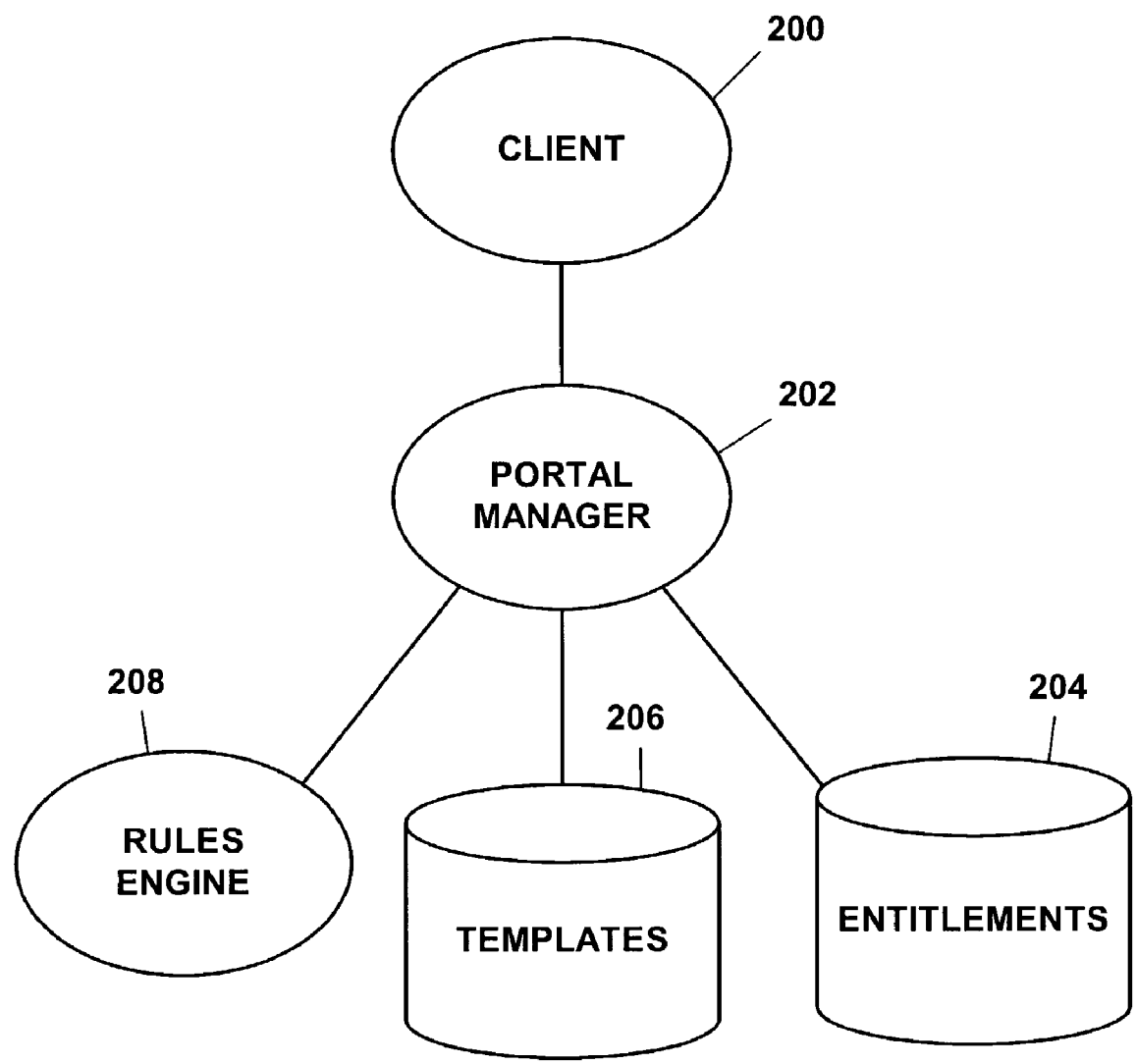
FIG. 3 is a diagram of a system in accordance to one embodiment of the invention.

FIG. 3 is a diagram of a system in accordance to one embodiment of the invention. Although this diagram depicts objects as functionally separate, such depiction is merely for illustrative purposes. It will be apparent to those skilled in the art that the objects portrayed in FIG. 3 can be arbitrarily combined or divided into separate software, firmware or hardware components. Furthermore, it will also be apparent to those skilled in the art that such objects, irregardless of how they are combined or divided, can execute on the same computer or can be arbitrarily distributed among different computers connected by a network. Finally, it is noted that such objects may also be contained within different execution environments (e.g., Java™ Servers, Enterprise Java Bean™ containers, etc.), however these are not depicted for clarity's sake.

A user may be considered anonymous or non-anonymous (e.g., identified specifically via a login procedure). Similarly, an anonymous user may belong to a default group (e.g., "everyone"), whereas a non-anonymous user may belong to one or more non-default groups. Rendering of a portal page begins when client 200 requests a template from portal manager 202. Such a request can contain user and group information. In one embodiment, client 200 can be a web browser. In another embodiment, client 200 can be any system capable of interacting with portal manager 202. In one embodiment, portal manager 202 can be an Enterprise Javabean™ (EJB). The Enterprise Javabeans™ package is available from Sun Microsystems, Inc. In another embodiment, portal manager 202 can be an independent process. In yet a further embodiment, portal manager 202 can part of client 200.

In one embodiment, if a user is non-anonymous, portal manager 202 retrieves the user's template, if any. If there is no user template, portal manager 202 retrieves a group template corresponding to the group. Finally, if there is no group template, portal manager 202 retrieves the default global template for the requested portal page. Similarly, if a user is anonymous, portal manager 202 retrieves a group template, if any, or the default global template. In one embodiment, once a template is retrieved, portal manager 202 binds portlets to placeholders in the template. In one embodiment, this can be accomplished by replacing identifier strings in an HTML table representing the template with directives to initiate portlet execution, such as Java Sever Page™ tag library calls. In one embodiment, templates and any other information needed to represent a portal and its pages can be persisted in Extensible Markup Language (XML) format. In another embodiment, templates and portlets can be persisted in data store 206. Data store 206 can be any media or medium designed to persist data, such as a relational database, an object-oriented database, a flat file, a cache, a buffer, etc.

In another embodiment, as part of binding portlets portal manager 202 checks to see whether the given portal user is entitled to remove, view or edit the portlet in question based on one or more entitlements. An entitlement is a rule that grants or denies access to a resource. In one embodiment, determination of an entitlement consists of dynamically associating roles to a user based on rules that take into account information about the user, information about the user's communication session, or the current state of the system. For example:

(1) When all of these conditions apply, the user is a GoldMember:
 Checking account balance>$5,000
 Combined account balance>$50,000

In rule (1) above, a user is deemed to satisfy the GoldMember role if there is more than $5,000 in their checking account and they have more than $50,000 in their combined accounts. Certain portlets, for example, may only be for GoldMember users. Thus, if only GoldMember users were entitled to execute the portlet in question, it would not be bound to a template for non-GoldMember users. Similarly, if the entitlement was for viewing, rather than execution, the portlet would be bound to the template but only GoldMember users could view it in client 200. If the entitlement was for editing, then the portlet would be bound to the template and would be visible to the user, however only GoldMember users would be allowed to edit the portlet's contents. Entitlements can be evaluated by rules engine 208. In one embodiment, entitlements are persisted in data store 204. After portlet manager 202 has bound portlets to the template, it provides the template to client 200. The portal page is then rendered based on the template.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for describing a portal page, comprising:
   defining a placeholder on a template;
   associating at least one portlet with the placeholder, wherein the portlet communicates with other portlets and defines a graphical user interface (GUI) based on the communication with other portlets, wherein the communication between portlets includes data exchange and functional interaction; and
   managing by the portlet of the portlet's GUI, wherein the portlet handles at least one user's input, generates content based upon interaction with the at least one user at the portlet level, and displays a response to the user input in the portlet GUI.

2. The method of claim 1 wherein:
   the portal page can be described with more than one template.

3. The method of claim 1 wherein:
   the template can have more than one placeholder.

4. The method of claim 1 wherein:
   the template is a Hypertext Markup Language (HTML) table and the placeholder is a cell in the table.

5. The method of claim 1 wherein:
   the template can be created and edited in a Hypertext Markup Language (HTML) editor.

6. The method of claim 1 wherein:
   the template and the at least one portlet can be persisted in Extensible Markup Language (XML).

7. The method of claim 1, further comprising:
   associating at least one entitlement with the at least one portlet.

8. The method of claim 7 wherein:
   the at least one entitlement includes at least one rule to associate a role with a user.

9. The method of claim 1 wherein the managing by a portlet further comprises displaying in the portlet GUI user requested information.

10. The method of claim 9 wherein managing by the portlet further comprises accepting selection by the at least one user of a particular portion of the user requested information and responding to the selection by displaying in the portlet GUI detailed information about the particular portion.

11. The method of claim 1 wherein the placeholder defines a region of the template in which the at least one portlet can display one of static content or dynamic content.

12. The method of claim 1 wherein the placeholder can have more than one portlet.

13. The method of claim 1 wherein the user can be one user in a group of users.

14. The method of claim 1 wherein the template can be customized for the at least one user or for a group of users.

15. The method of claim 14 wherein customization of the template is performed by the at least one user and includes at least one of adding, removing, repositioning, editing and configuring the at least one portlet.

16. The method of claim 1 wherein:
   the template affords a plurality of levels of customization, wherein each level of customization the template includes at least one of removing, repositioning, editing and configuring the at least one portlet.

17. A method for describing a portal page, comprising:
   defining a template, the template having a placeholder;
   associating at least one portlet with the placeholder, wherein the at least one portlet communicates with other portlets and defines a graphical user interface (GUI) based on the communication with other portlets, wherein the communication between portlets includes data exchange and functional interaction;
   customizing of the template for at least one of a group and a user, wherein customization of the template is performed by the at least one of the group and the user and includes at least one of adding, removing, repositioning, editing and configuring the at least one portlet; and
   managing by the portlet of the portlet's GUI, wherein the portlet handles at least one user's input, generates content based upon interaction with the at least one user at the portlet level, and displays a response to the user input in the portlet GUI.

18. The method of claim 17 wherein:
   the portal page can be described with more than one template.

19. The method of claim 17 wherein:
   the template can have more than one placeholder.

20. The method of claim 17 wherein:
   the template is a Hypertext Markup Language (HTML) table and the placeholder is a cell in the table.

21. The method of claim 17 wherein:
   the template can be created and edited in a Hypertext Markup Language (HTML) editor.

22. The method of claim 17 wherein:
   the template and the at least one portlet can be persisted in Extensible Markup Language (XML).

23. The method of claim 17, further comprising:
   associating at least one entitlement with the at least one portlet.

24. The method of claim 23 wherein:
   the at least one entitlement includes at least one rule to associate a role with a user.

25. The method of claim 17 wherein the managing by a portlet further comprises displaying in the portlet GUI user requested information.

26. The method of claim 25 wherein managing by the portlet further comprises accepting selection by the at least one user of a particular portion of the user requested information and responding to the selection by displaying in the portlet GUI detailed information about the particular portion.

27. The method of claim 17 wherein the placeholder defines a region of the template in which the at least one portlet can display one of static content or dynamic content.

28. The method of claim 17 wherein the placeholder can have more than one portlet.

29. The method of claim 17 wherein the user can be one user in a group of users.

30. A method for rendering a portal page, comprising:
   selectively associating at least one portlet with a placeholder in a customizable template,
   wherein the association is based on evaluation of at least one entitlement; and defining a graphical user interface (GUI) by the at least one portlet based on the communication with other portlets, wherein the at least one portlet communicates with other portlets and handles at least one user's input, generates content based upon interaction with the at least one user at the portlet level, and displays a response to the user input in the portlet GUI, wherein the communication between portlets includes data exchange and functional interaction.

31. The method of claim 30 wherein:
the portal page can be rendered with more than one template.

32. The method of claim 30 wherein:
the template can have more than one placeholder.

33. The method of claim 30 wherein:
the template is a Hypertext Markup Language (HTML) table and the placeholder is a cell in the table.

34. The method of claim 30 wherein:
the template can be created and edited in a Hypertext Markup Language (HTML) editor.

35. The method of claim 30 wherein:
customization of the template is performed by at least one of a group and a user and includes at least one of adding, removing, repositioning, editing and configuring the at least one portlet.

36. The method of claim 30 wherein:
the template and the at least one portlet can be persisted in Extensible Markup Language (XML).

37. The method of claim 30 wherein:
the at least one entitlement includes at least one rule to associate a role with a user.

38. A system for rendering a portal page, comprising:
a portal manager to selectively bind at least one portlet to a template, wherein each portlet defines a graphical user interface (GUI) based on the communication with other portlets,
wherein the communication between portlets includes data exchange and functional interaction;
a client to accept the bound template from the portal manager;
a rules engine coupled to the portal manager to determine which of the at least one portlets are selectively bound; and
wherein each portlet can manage the portlet's GUI, and wherein each portlet communicates with other portlets and handles at least one user's input, generates content based upon interaction with the at least one user at the portlet level, and displays a response to the input in the portlet GUI.

39. The system of claim 38 wherein:
the portal page can be rendered with more than one template.

40. The system of claim 38, further comprising:
a placeholder, wherein the at least one portlet is associated with the placeholder.

41. The system of claim 40 wherein:
the template is a Hypertext Markup Language (HTML) table and the placeholder is an HTML table cell.

42. The system of claim 38 wherein:
the template can be created and edited in a Hypertext Markup Language (HTML) editor.

43. The system of claim 38 wherein:
the template and the at least one portlet definition can be persisted in Extensible Markup Language (XML).

44. The system of claim 38, further comprising:
the rules engine evaluates at least one entitlement.

45. The system of claim 44 wherein:
the at least one entitlement includes at least one rule to associate a role with a user.

46. The system of claim 38 wherein the at least one portlet displays in the portlet GUI user requested information.

47. The system of claim 46 wherein the at least one portlet accepts selection by the at least one user of a particular portion of the user requested information and responds to the selection by displaying in the portlet GUI detailed information about the particular portion.

48. The system of claim 38 wherein the placeholder defines a region of the template in which the at least one portlet can display one of static content or dynamic content.

49. The system of claim 38 wherein the placeholder can have more than one portlet.

50. The system of claim 38 wherein the user can be one user in a group of users.

51. The system of claim 38 wherein the template can be customized for the user or for a group of users.

52. The method of claim 51 wherein customization of the template is performed by the at least one user and includes at least one of adding, removing, repositioning, editing and configuring the at least one portlet.

53. A method for describing a portal page, comprising:
creating a second template for a user group by a group administrator based on a first template which first template has at least one portlet, wherein the at least one portlet communicates with other portlets and handles at least one user's input, generates content based upon interaction with the at least one user at the portlet level, and displays a response to the user input in the at least one portlet GUI, wherein the user group is an arbitrary collection of users that is determined statically or dynamically by evaluating rules that take into account information about a user and other information, wherein the communication between portlets includes data exchange and functional interaction;
customizing the second template to include at least one of removing, repositioning, editing and configuring the at least one portlet; and
creating a third template based on the second template and customizing the third template to include at least one of removing, repositioning, editing and configuring the at least one portlet of the second template.

54. The method of claim 53 wherein:
the first template has at least one placeholder; and
wherein the second template has at least one placeholder.

55. The method of claim 53 wherein:
at least one of the first template and the second template is a Hypertext Markup Language (HTML) table.

56. The method of claim 53 wherein:
at least one of the first template and the second template can be created and edited in a Hypertext Markup Language (HTML) editor.

57. The method of claim 53 wherein:
the first template and the second template can be persisted in Extensible Markup Language (XML).

58. The method of claim 53, further comprising:
associating at least one entitlement with at least one portlet.

59. The method of claim 58 wherein:
the at least one entitlement includes at least one rule to associate a role with a user.

60. The method of claim 53 wherein the at least one portlet displays in the portlet GUI user requested information.

61. The method of claim 60 wherein the at least one portlet accepts selection by the at least one user of a particular portion of the user requested information and responds to the selection by displaying in the portlet GUI detailed information about the particular portion.

62. The method of claim 53 wherein the at least one portlet can display one of static content or dynamic content.

63. The method of claim 53 wherein the placeholder can have more than one portlet.

64. The method of claim 53 wherein the user can be one user in a group of users.

65. The method of claim 53 wherein the first template can be a global template or a group template.

66. The method of 53, wherein the customized template for a user group is created by a one or more users delegated by the group administrator.

67. The method of 53, wherein the user group has only one user.

68. A machine readable medium having instructions stored thereon that when executed by a processor cause a system to:
define a placeholder on a template;
associate at least one portlet with the placeholder, wherein the portlet communicates with other portlets and defines a graphical user interface (GUI) based on the communication with other portlets, wherein the communication between portlets includes data exchange and functional interaction; and
wherein the at least one portlet can manage the portlet's GUI, and wherein the portlet handles at least one user's input, generates content based upon interaction with the at least one user at the portlet level, and displays a response to the input in the portlet GUI.

* * * * *

UNITED STATES PATENT AND TRADEMARK OFFICE
CERTIFICATE OF CORRECTION

PATENT NO. : 7,472,342 B2  Page 1 of 1
APPLICATION NO. : 10/279663
DATED : December 30, 2008
INVENTOR(S) : Haut et al.

It is certified that error appears in the above-identified patent and that said Letters Patent is hereby corrected as shown below:

On the Title Page, Item (56), under "Other Publications", line 1, delete "Enalbing" and insert -- Enabling --, therefor.

Item (57), in "Abstract", line 4, before "least" insert -- at --.

Page 3, Item (56), under "U.S. Patent Documents", line 56, delete "Ilesmer et al." and insert -- Hesmer et al. --, therefor.

On page 4, Item (56), under "Other Publications", line 18, delete "Advances" and insert -- Advanced --, therefor.

On page 5, Item (56), under "Other Publications", lines 2-3, before "& Privacy" delete "on Security".

In column 9, line 1, in Claim 66, after "The method of" insert -- claim --.

In column 9, line 1, in Claim 67, after "The method of" insert -- claim --.

Signed and Sealed this

Fourth Day of May, 2010

David J. Kappos
*Director of the United States Patent and Trademark Office*